United States Patent
Brand et al.

(10) Patent No.: US 10,484,082 B2
(45) Date of Patent: Nov. 19, 2019

(54) SPACE ASSET TRACKER

(71) Applicant: HARRIS CORPORATION, Melbourne, FL (US)

(72) Inventors: Jerry C. Brand, Melbourne Beach, FL (US); Derek M. Tournear, Herndon, VA (US); Andrew J. Lee, Melbourne, FL (US); Thomas B. Campbell, Satellite Beach, FL (US); Norberto H. Marquez-Arroyo, Melbourne, FL (US)

(73) Assignee: Haris Corporation, Melbourn, FL (US)

( * ) Notice: Subject to any disclaimer, the term of this patent is extended or adjusted under 35 U.S.C. 154(b) by 738 days.

(21) Appl. No.: 15/367,849

(22) Filed: Dec. 2, 2016

(65) Prior Publication Data

US 2018/0239024 A1  Aug. 23, 2018

(51) Int. Cl.
   *H04B 7/185* (2006.01)
   *G01S 19/14* (2010.01)
   *G01S 5/00* (2006.01)

(52) U.S. Cl.
   CPC ........ *H04B 7/18519* (2013.01); *G01S 5/0027* (2013.01); *G01S 19/14* (2013.01); *H04B 7/185* (2013.01)

(58) Field of Classification Search
   CPC ... H04B 7/18519; H04B 7/185; G01S 5/0027; G01S 19/14
   See application file for complete search history.

(56) References Cited

U.S. PATENT DOCUMENTS

| | | | |
|---|---|---|---|
| 5,379,224 A * | 1/1995 | Brown | G01S 5/0009 340/989 |
| 5,936,570 A | 8/1999 | Ghazvinian et al. | |
| 5,995,040 A | 11/1999 | Issler et al. | |
| 6,072,786 A | 6/2000 | Wang et al. | |
| 6,115,371 A | 9/2000 | Berstis et al. | |
| 6,127,967 A | 10/2000 | Ghazvinian et al. | |
| 6,151,340 A | 11/2000 | Rivers | |
| 6,606,560 B1 | 8/2003 | Clark | |
| 6,684,070 B1 | 1/2004 | Rosen et al. | |
| 7,134,630 B2 | 11/2006 | Plotke et al. | |
| 7,154,439 B2 | 12/2006 | Westall | |
| 7,258,306 B2 | 8/2007 | Plotke et al. | |
| 7,528,773 B2 | 5/2009 | Fall et al. | |
| 7,564,404 B2 | 7/2009 | Katz | |

(Continued)

OTHER PUBLICATIONS

"The Threat of Orbital Debris and Protecting NASA Space Assets from Satellite Collisions," National Aeronautics and Space Administration, Apr. 28, 2009.

(Continued)

*Primary Examiner* — Russell Frejd
(74) *Attorney, Agent, or Firm* — Fox Rothschild LLP; Robert J. Sacco; Carol E. Thorstad-Forsyth (57) ABSTRACT

Space asset tracking system includes a space asset tag (SAT) disposed in a tag housing. A space vehicle tracking system (SVTS) disposed within the tag housing includes a power supply, a position sensing receiver system (PSRS), and a ground link radio frequency (GLRF) transmitter under the control of a processing circuit. The processing circuit selectively causes the GLRF transmitter to automatically transmit tracking information based on the position information. The system can also include a ground station for receiving the tracking information.

22 Claims, 3 Drawing Sheets

(56) References Cited

U.S. PATENT DOCUMENTS

| | | | |
|---|---|---|---|
| 7,761,054 B1 | 7/2010 | Lozano | |
| 7,881,663 B2 | 2/2011 | Jo et al. | |
| 8,181,511 B2 * | 5/2012 | Meier | G01W 1/00 |
| | | | 702/2 |
| 8,385,223 B2 | 2/2013 | Miller et al. | |
| 8,653,784 B2 * | 2/2014 | Bland | H02J 17/00 |
| | | | 320/101 |
| 9,031,497 B1 | 5/2015 | Hoffman et al. | |
| 2003/0203717 A1 * | 10/2003 | Chuprun | G06K 13/0825 |
| | | | 455/12.1 |
| 2006/0281435 A1 * | 12/2006 | Shearer | G06K 19/0707 |
| | | | 455/343.1 |
| 2009/0182502 A1 * | 7/2009 | Riter | G01S 19/07 |
| | | | 701/472 |
| 2009/0251295 A1 * | 10/2009 | Norair | G06K 19/0716 |
| | | | 340/10.51 |
| 2012/0232724 A1 * | 9/2012 | Janky | G01S 19/07 |
| | | | 701/13 |
| 2014/0218242 A1 * | 8/2014 | Platzer | G01S 5/0027 |
| | | | 342/454 |

OTHER PUBLICATIONS

Space Based Space Survellance, "Revolutionizing Space Awareness," 2010.

Gruss, M., "AGI, Lockheed Tout Commercial Space Surveillance Systems," SpaceNews, Mission to Success, Sep. 1, 2014.

* cited by examiner

SPACE ASSET TRACKER

BACKGROUND

Statement of the Technical Field

The technical field of this disclosure comprises earth orbiting satellites, and more particularly concerns methods and systems for tracking earth orbiting satellite equipment and services.

Description of the Related Art

Operational control of space orbiting satellites requires knowledge of their position and velocity. Likewise, delivery of satellite services require that equipment managers are able to track and control the position, velocity and orbit of satellites in Earth orbit. Further, accurate and up-to-date information concerning satellite position and velocity is important to prevent collisions. As the number of satellites in orbit grows, the potential for collision between satellites increases. Many new satellite assets compound congestion to the already crowded area surrounding Earth.

Systems for tracking satellites have traditionally used visual, radar and optical methods. These methods can be employed using ground locations as well as using airborne and space-borne platforms. Ground tracking methods require large and complex installations including high prime power and massive structures for stable operation. Airborne and space-borne operation involve complex tracking mechanisms and onboard two-way communications.

The U.S. Strategic Command (USSTRATCOM), through its Joint Space Operations Center (JSpOC) is tasked with tracking all artificial objects in Earth orbit. But tracking limitations exist since the majority of JSpOC space tracking radars are located in the Northern Hemisphere. Accordingly, JSpOC relies on this tracking radar information as well as data provided from the satellite owner/operators to consistently track the location and velocity of such satellites.

There is a rapidly growing interest in small low-cost satellite systems in Low Earth orbit (LEO) and to a lesser extent Medium Earth orbit (MEO) and Geosynchronous orbit (GEO). A Low Earth orbit is any orbit below 2,000 km. A Medium Earth orbit is defined as any orbit between 2,000 and 35,786 km. A geosynchronous orbit is an orbit with an altitude of 35,786 kilometers.

Nanosatellites are small satellites which are often used for research. CubeSats are a type of nanosatellites which are relatively small in size (e.g., 10 cm×10 cm×10 cm) and commonly weigh less than 1.33 kg. The CubeSat Launch Initiative (CSLI) organized by the National Aeronautics And Space Administration (NASA) provides access to space for CubeSats, developed by the NASA Centers and programs, educational institutions and non-profit organizations. This program offers CubeSat developers access to a low-cost pathway to conduct research in the areas of science, exploration, technology development, education or operations.

SUMMARY

Embodiments concern a space asset tracking system comprised of a space asset tag (SAT). The SAT includes a tag housing and a space vehicle tracking system (SVTS) disposed within the tag housing. The SVTS includes a power supply which exclusively provides electrical power to the SVTS. For example, the power supply can include a battery and/or a photovoltaic cell. A position sensing receiver system (PSRS) is also included in the SVTS. The PSRS is configured to detect a position of the SVTS based on PSRS radio signals which are received respectively from a plurality of earth orbiting satellites. For example, the PSRS can be configured to derive the position using signals associated with one or more satellite-based navigation systems selected from the group consisting of a Global Positioning System (GPS), a Global Navigation Satellite System (GLONASS), a Galileo Global Navigation Satellite System (GNSS), a BeiDou Navigation Satellite System, a GPS Aided GEO Augmented Navigation (GAGAN) system, and an Indian Regional Navigation Satellite System (IRNSS). A PSRS antenna system can be integrated in or on the tag housing and operatively coupled to the PSRS to facilitate receiving the PSRS radio signals.

A processing circuit associated with the SVTS receives from the PSRS position information specifying at least the position. The SAT further includes a ground link radio frequency (GLRF) transmitter under the control of the processing circuit. A GLRF antenna system is integrated in or on the tag housing and operatively coupled to the GLRF transmitter to facilitate transmitting the tracking information to the one or more designated ground stations. According to one aspect, the GLRF antenna system may comprise an omnidirectional antenna for transmitting the tracking information to the one or more designated ground stations.

The processing circuit is configured to selectively cause the GLRF transmitter to automatically transmit tracking information based on the position information. According to one aspect, the processing circuit causes the tracking information to be transmitted exclusively during periods when a direct radio frequency communication link is possible with one or more designated ground stations.

The space asset tag is advantageously configured so that it is exclusive of a GLRF receiver for receiving radio signals (e.g. tracking position interrogation signals) from a ground station. Instead, the processing circuit is configured to autonomously cause the tracking information to be transmitted exclusive of control signals external of the space asset tag. The SVTS can include one or more sensing elements which detect when the space asset tag is in a space environment to facilitate such autonomous control and minimize power consumption until such time as the SAT is launched into space on a satellite.

The SVTS can include at least one data storage device in which a ground station database is stored. The ground station database contains map information sufficient to facilitate a determination of when the space asset tag is located to transmit the tracking information to one or more of the ground stations. The processing circuit is configured to compare the position information obtained from the PSRS to the information contained in the ground station database to determine when the tracking data should be transmitted.

According to one aspect, the GLRF transmitter configured to transmit the tracking information at a specified frequency contained within the Ultra High Frequency (UHF) band. Further, the GLRF transmitter can be designed so that it has a maximum power output of between 20 mW and 100 mW so as to reduce power consumption. The GLRF transmitter advantageously is configured to transmit the tracking information in a transmitted signal having a bandwidth not exceeding 500 Hz so as to maximize the number of SAT which can operate within a predetermined bandwidth.

The space asset tracking system can further include at least one ground station located on the surface of the earth. The ground station is configured for receiving the tracking information transmitted by the GLRF transmitter. In this regard, the ground station advantageously includes at least one processing circuit configured to automatically remove a Doppler shift in a received signal from the space asset tag.

Performing such Doppler compensation operations at the ground station further reduces the power consumption and weight of the SAT.

BRIEF DESCRIPTION OF THE DRAWINGS

Embodiments will be described with reference to the following drawing figures, in which like numerals represent like items throughout the figures, and in which.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

Figure 1:
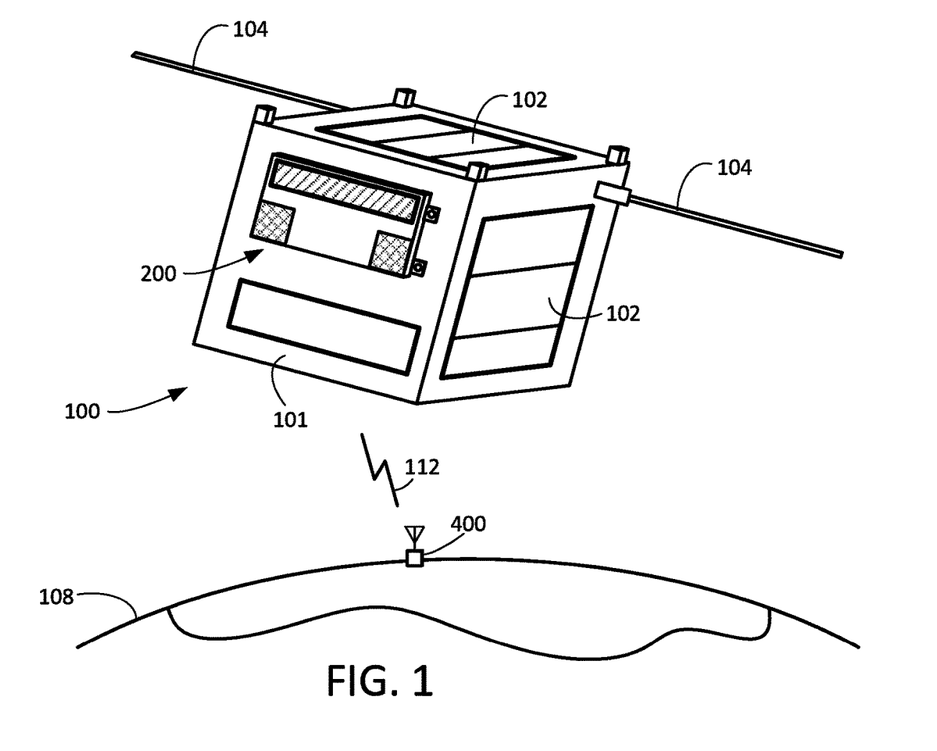
FIG. 1 is a drawing which is useful for understanding a relationship between a space asset tag, a satellite and a ground station.

Embodiments disclosed herein concern a space asset tracking system. As shown in FIG. 1 a satellite 100 for orbital space operation can comprise a vehicle chassis 101 in which a satellite payload (not shown) is contained. The satellite 100 can have various features to facilitate on orbit functions (e.g. research functions) which can include antennas 104 for communicating and photovoltaic panels 102 for supplying electrical power to the satellite. According to one aspect, the satellite 100 can comprise a nanosatellite. For example, the satellite 100 can conform to a class of research spacecraft which are sometimes referred to as CubeSats.

More than 10,000 space assets have been projected for launch in the next ten years. Space vehicle asset collision probabilities grow as the number of satellites increase. This is especially true for small satellites which may lack attitude control. Each satellite owner/operator is responsible for the orbit of their satellite assets. Accordingly, to facilitate the tracking requirements for small satellites embodiments herein concern a space vehicle tracking system. The system is comprised of a space asset tag (SAT) that can be attached to a satellite. The SAT enables tracking of equipment (satellite position, velocity and time (PVT)) for assets in LEO, MEO and GEO. The tracking function is facilitated using a low-cost ground station which receives tracking information from the space asset tag.

A space asset tag disclosed herein is designed for minimal size, weight and power (SWaP) requirements. It has an independent power supply that can potentially facilitate tracking functionality for periods exceeding three years. Moreover, the space asset tag is self-contained space qualified device, meaning that it can perform independent operation at altitudes exceeding 100 km above the surface of the earth. Consequently, it can be installed on a body of any satellite and used on orbit without the need for the satellite developer to engage in further design, development, integration or qualification testing. Finally, a space asset tag as disclosed herein is fully compliant with all existing International Telecommunications Union (ITU) regulations which sets forth international rules pertaining to the utilization of radio frequencies.

Figure 2:
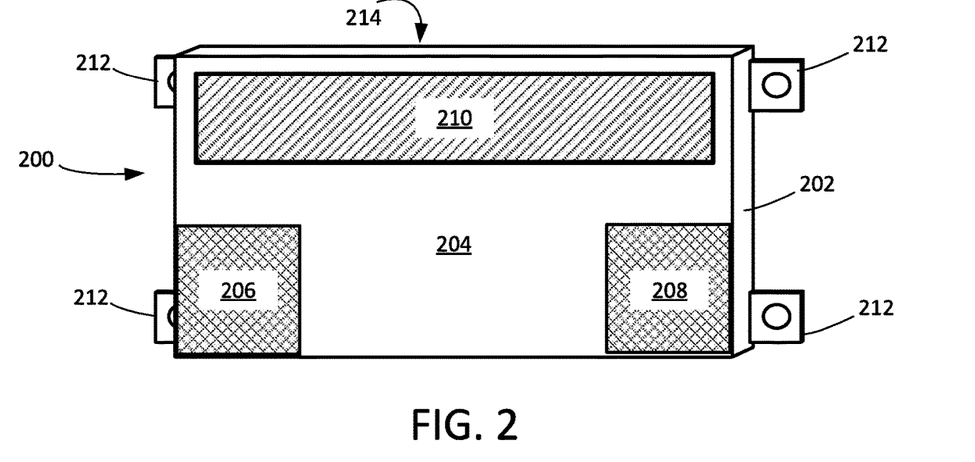
FIG. 2 is an enlarged view showing certain details of a space asset tag.

As shown in FIGS. 1 and 2, a space asset atag 200 can be attached to a chassis of a satellite 100 for communicating tracking information to a ground station 400 located on the surface of the earth 108. The space asset tag 200 can be attached to any type of satellite but it is particularly suited for small satellites in which considerations of cost, weight and complexity are paramount aspects of the overall spacecraft design. In these types of satellites, integrating a tracking system with the vehicle power and control systems can add undesirable weight, complexity, and cost. It can also increase power drain on any power supply incorporated into the vehicle. So the space asset tag 200 is designed to be a complete tracking system with its own power supply, location sensing, and reporting components in a small lightweight form factor.

The space asset tag 200 has a housing 202 which is independent of satellite 100. It operates as a completely independent and autonomous system which is not under the control of the satellite 100 or any other device. Moreover, the space asset tag 200 advantageously has its own power supply integrated within its housing that is independent of the power supply for satellite 100 to which it is attached. In some scenarios, this power supply can include photovoltaic cells disposed on the exterior of the housing.

The physical configuration of the space asset tag 200 is advantageously arranged so that it can reside within the peripheral limits which define the exterior dimensions of small satellites such as CubeSats. As is known, CubeSats are a class of nanosatellites that use a standard size and form factor. The standard CubeSat size uses a "one unit" or "1U" measuring 10×10×10 cms and is extendable to larger sizes; 1.5, 2, 3, 6, and even 12U. To facilitate fitment on devices as small as a 1U CubeSat, the space asset tag 200 will advantageously have physical dimensions which are diminutive. In an embodiment, the physical configuration of the space asset tag 200 is advantageously arranged so that the entire tag housing 202 can reside within the peripheral limits of a 1U CubeSat. For example, an embodiment space asset tag 200 disclosed herein (including its integrated power supply) has exterior dimensions less than or equal to about 75 mm×100 mm×9 mm and advantageously weighs less than about 115 g. Of course, embodiments are not limited in this regard and other physical configurations are possible.

The tag housing 202 is formed of a rigid lightweight material that is capable of withstanding the rigors of a harsh orbital environment. For example, the housing must withstand frequent and dramatic temperature variations, radiation and the vacuum of space without loss of strength or stiffness. An exemplary material that is suitable for this purpose can include aluminum or an aluminum alloy. Alternative embodiments can include a housing formed of a composite material (e.g., a carbon composite material). However, the embodiments are not so limited and other materials can also be used for this purpose. The tag housing can include mounting structure to facilitate attachment to a satellite 100. In some embodiments, the mounting structure can comprise mounting elements 212 suitable for receiving fasteners such as screws, clips, bolts or rivets.

Two or more antennas can be disposed on the exterior of the tag housing 202 on a major exterior face 204. The major exterior face 204 is advantageously a housing face which is opposed from a mounting face 214 of the tag housing 202. However, embodiments are not limited in this regard and other antenna mounting locations are possible. The antennas can include PSRS antenna 206 associated with a position sensing receiver system (PSRS) and GLRF antenna 208 associated with a ground link radio frequency (GLRF) transmitter. The PSRS and GLRF transmitter will be discussed below in further detail. Antenna feed lines (not shown in FIG. 2) extend through the housing 202 to couple the antennas 206, 208 to components disposed interior of the housing. In some embodiments, a photovoltaic element 210 can also be disposed on the exterior of the housing 202. The purpose of the photovoltaic element 210 will become apparent from the more detailed description below.

The space asset tag 200 is comprised of a space vehicle tracking system (SVTS) which is disposed within the tag housing 202. The SVTS is comprised of various electronic components which are designed and tested to work in the vacuum of space. Accordingly, the tag housing 202 need not be air tight. For example, in some embodiments, the housing can be vented to allow for air trapped within to be vented to the environment when the space asset tag first arrives in space. Of course, embodiments are not limited in this regard and the tag housing 202 can optionally be hermetically sealed so as to prevent air or other gasses from entering or leaving the internal space defined within the housing.

Figure 3:
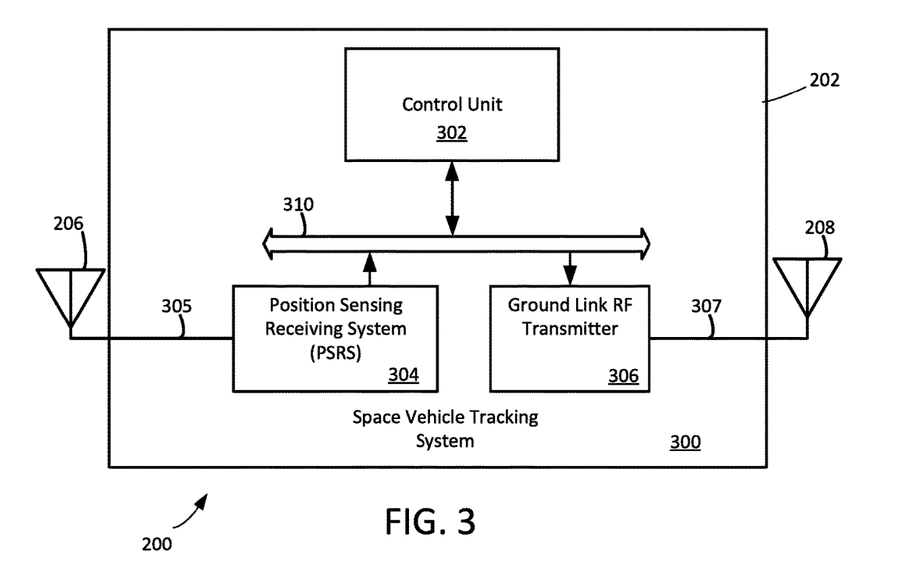
FIG. 3 is a block diagram which is useful for understanding certain aspects of a space vehicle tracking system (SVTS).

A simplified block diagram of the space asset tag 200 is shown in FIG. 3. As illustrated therein, an SVTS 300 includes a control unit 302, a position sensing receiver system (PSRS) 304, and a ground link RF (GLRF) transmitter 306. The PSRS 304 is coupled by means of an antenna feed line 305 to the PSRS antenna 206. The GLRF transmitter is coupled by means of an antenna feed line 307 to the GLRF antenna 208. In some embodiments, a communication bus 310 can facilitate communications of control signals and data between the control unit 302, PSRS 304, and GLRF transmitter 306.

The PSRS antenna 206 can be any antenna system that is suitable for receiving PSRS signals from one or more orbiting navigation satellites. A planar PSRS antenna is advantageous as it can be compactly disposed on the surface of the tag housing. The GLRF antenna 208 can likewise be any suitable type of antenna which is capable of radiating RF signals generated by the GLRF transmitter with satisfactory efficiency. However, a planar antenna design is advantageous as it can permit the antenna to be compactly disposed on the surface of the tag housing. For spacecraft with attitude control, the GLRF antenna 208 can be directional to provide increased gain in a direction of a ground station 400. However, it is anticipated that attitude control may be absent in many scenarios involving small satellites as described herein (e.g. CubeSats). Accordingly, the GLRF antenna 208 can be an antenna design which is omnidirectional or nearly omnidirectional when considered in the far field of the antenna. Such an omnidirectional design can ensure that the tracking messages transmitted by the GLRF antenna are received at the ground station regardless of whether the satellite 100 is oriented properly or tumbling while in orbit.

The PSRS 304 is configured to detect a position of the SVTS based on PSRS radio signals which are received respectively from a plurality of earth orbiting satellites. For example, the PSRS can be a receiver system that is configured to derive the position of the tag using signals associated with at least one of a Global Positioning System (GPS) and a Global Navigation Satellite System (GLONASS). As such the PSRS can be a GPS receiver system, a GLONASS receiver system, or any other similarly available system. GPS and GLONASS receiver systems are well known in the art and therefore will not be described here in detail. However, it will be appreciated that such systems receive radio signals from a plurality of earth orbiting satellites, and use such signals to derive a precise position or location of the PSRS antenna 206. Other similar systems that could potentially be used are the Galileo Global Navigation Satellite System (GNSS), the BeiDou Navigation Satellite System, the GPS Aided GEO Augmented Navigation (GAGAN) system, and the Indian Regional Navigation Satellite System (IRNSS). It should be appreciated that the PSRS 304 can in some embodiments use signals from multiple satellite navigation systems to derive position information.

The control unit 302 is comprised of a processing circuit which facilitates controls over the operation of the SVTS. The control unit receives from the PSRS position information specifying at least the position of the space asset tag 200 when the space asset tag is in orbit around the earth. Such position information can include latitude coordinates, longitude coordinates and altitude information as determined by the PSRS. The information communicated from the PSRS to the control unit can also include a time stamp which specifies a time when the position information was acquired. In some embodiments, the information communicated from the PSRS to the control unit can also include a velocity value specifying the velocity of the space asset tag 200. Alternatively, the control unit 302 can use the time stamp and position information to determine a velocity of the space asset tag 200.

The control unit 302 uses the information from the PSRS to generate tracking message data. The tracking message data can include one or more of position information, velocity information and time stamp data as derived from the PSRS. The control unit 302 will also use the position information to determine when it is in a position that is suitable for communicating with a ground station 400 having a predetermined location on the surface of the earth 108. A suitable location for such transmission will include locations where there is an unobstructed line of sight path between the GLRF antenna 208 and a ground station antenna to facilitate a communication link 112. However, in some embodiments, the control unit 302 can be more selective when choosing a transmission location. For example, the control unit can instead transmit the message data at a location which has an unobstructed line-of-sight path between the space asset tag and the ground station, and is further chosen to minimize a vector distance between the space asset tag and the ground station antenna. When the space asset tag is in a suitable position determined by the control unit 302, the control unit will cause the GLRF transmitter 306 to transmit the tracking message data to the ground station 400, using the antenna 208.

The determinations involving when and/or where the tracking message data should be transmitted are performed autonomously by the control unit 302. Accordingly, there is no need for communicating command and/or control signals to the SVTS 300 from an onboard control system (not shown) associated with the satellite 100. This autonomous functionality is advantageous because a designer of a satellite 100 can entirely avoid design, development and integration efforts that would otherwise be necessary to provide a satellite tracking reporting system.

Moreover, due to such autonomous operation, there is no need for any interrogation signal to be transmitted from a ground station 400 to initiate or prompt the transmission of the tracking message data from the space asset tag 200. So there is also no need for any type of GLRF receiver in the space asset tag for receiving interrogation signals from a ground station transmitter. Avoidance of such a GLRF receiver in the space asset tag helps reduce size, weight and power requirements of the SVTS. The absence of any necessity for interrogation signals from a ground station 400 transmitter is also advantageous for a low cost solution as described herein. In particular, the broadcasting of such interrogation signals can involve complex and expensive spectrum licensing issues and the autonomous broadcast operations of the tag facilitates avoidance of such issues.

Figure 4:
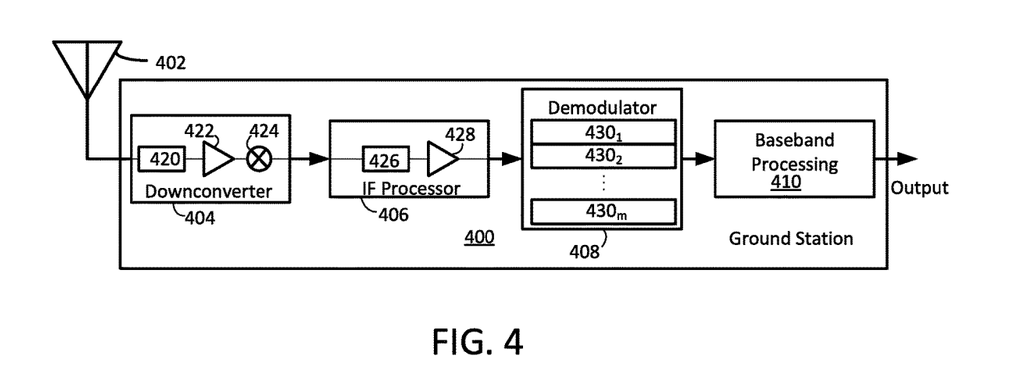
FIG. 4 is a block diagram which is useful for understanding certain aspects of a ground station used in conjunction with the space asset tag for tracking satellites.

A simplified block diagram of a ground station 400 is shown in FIG. 4. The ground station includes a receiving antenna 402 and a radio receiver tuned for receiving transmitted tracking message data from the space asset tag 200. In an exemplary embodiment, the radio receiver can include a downconverter 404. The downconverter can comprise a mixing element 424 which is configured to convert transmitted RF signal energy from the GLRF transmitter 306 to a suitable intermediate frequency (IF) signal. In some scenarios, the downconverter can also include an RF amplifier 422 and/or RF filter circuitry 420. The IF signal output of the downconverter 404 is coupled to the IF processor 406. The IF processor 406 contains one or more IF processing elements which perform signal processing operations on the IF signal. For example, the IF processing elements can include one or more IF filters 426 and IF signal amplifiers 428 which prepare the IF signal for demodulation. The output of the IF processor 406 is communicated to a demodulator 408. The demodulator extracts from the IF signal processor output a modulated baseband carrier signal and communicates this to a baseband processing element 410. The baseband processing element 410 can perform forward error correction and decoding functions appropriate to the tracking message data signal.

In order to minimize power consumption in a space asset tag 200, tracking message data is communicated to the ground station 400 using low power short duration transmissions. For example, in some embodiments the transmit power can be in the range of between 20 to 100 mW. To facilitate such low power transmissions, the tracking message data is also transmitted at a low data rate so that long integration times are possible. The long integration times facilitate accurate data symbol estimation under conditions of very low signal to noise ratio, such as when the received signal power is at or near the noise floor of a ground station receiver. A forward error correction scheme is advantageously applied to the transmitted tracking message data to help ensure error free communication.

According to one aspect, a frequency shift keying (FSK) modulation scheme can be used by the GLRF transmitter for transmitting tracking message data. An exemplary modulation scheme used in an embodiment for transmitting tracking message data is a low rate multiple frequency shift keying (MFSK) waveform in which digital information is transmitted through multiple discrete frequency changes of a carrier signal. MFSK is an M-ary orthogonal signaling scheme so each of M tone detection filters $430_1$ . . . $430_m$ at the demodulator 408 will only correspond to its tone and not at all to the other M tones. Each of the M tones represents one symbol and the GLRF transmitter transmits one tone at a time. Values of M used for the above described waveform can potentially range from 4 to 64. However, in an embodiment MFSK waveform used herein M=16 (i.e. 16-MFSK) such that 16 possible frequency shifts are used to communicate 16 symbols. Further, each symbol is comprised of 4 bits to achieve a bit rate of 62 bits per second corresponding to a baud rate of 15.62.

A significant Doppler shift can result from the difference in velocity as between the space asset tag 200 and the ground station antenna 402. MFSK can tolerate significant Doppler spreads when augmented with forward error correction. But in an embodiment disclosed herein, additional compensation for this Doppler shift is advantageously performed at the ground station receiver 400. Performing such Doppler compensation in the ground station receiver 400 (as opposed to the space asset tag) simplifies the design and complexity of the space asset tag. As the SAT uses short messaging times, the Doppler shift rate-of-change remains essentially linear over the reception time. An initial known symbol, hence tone frequency, provides a reference point for the expected received signal. Monitoring this tone over its symbol duration enables the Doppler rate of change to be calculated. This supplies a simple linear correction that removes the Doppler shift and stabilizes the tone frequencies for demodulation over the entire transmission duration. The Doppler compensation operations described herein can be performed in the baseband processing element 410 or in the demodulator 408.

Figure 5:
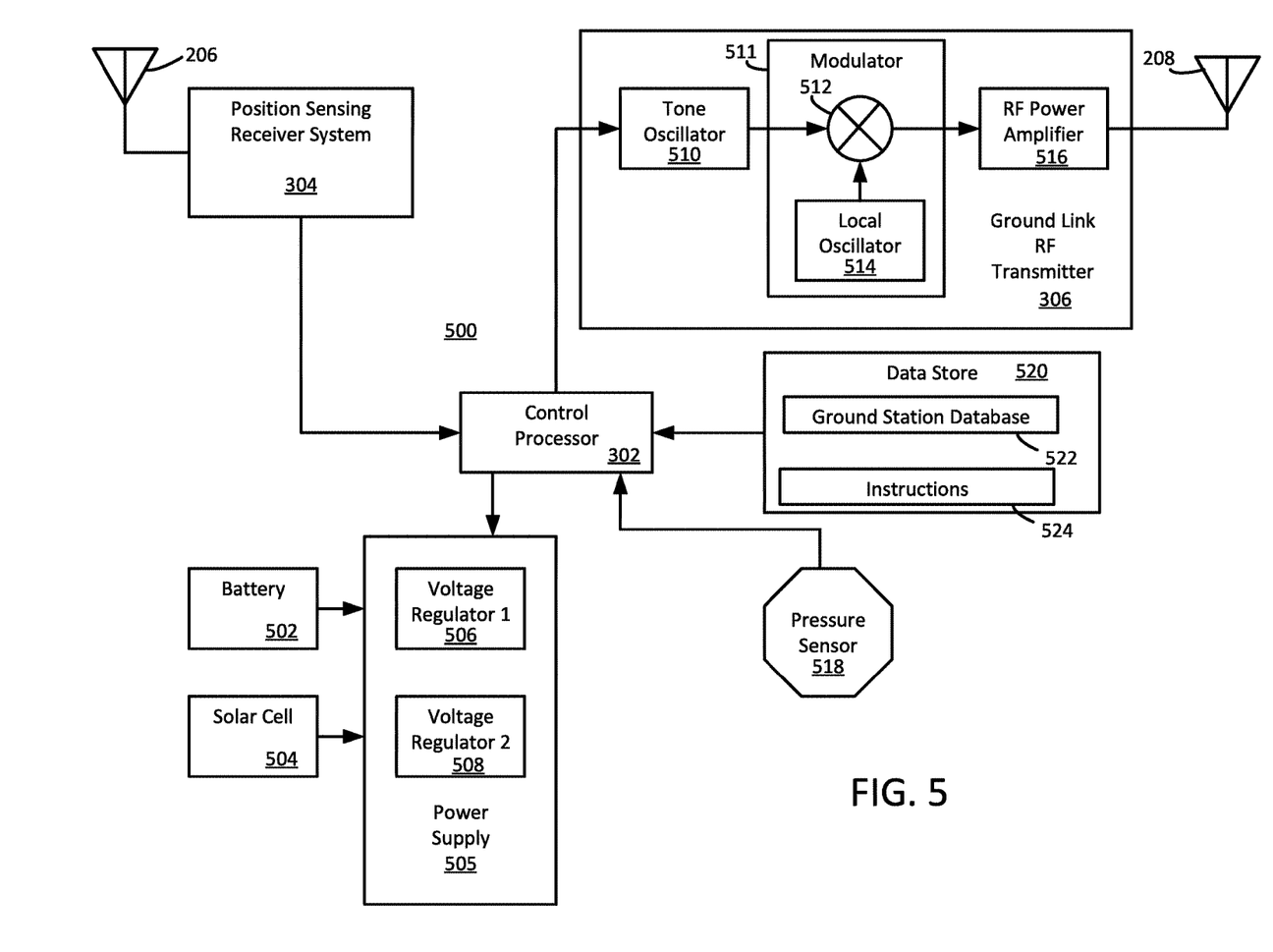
FIG. 5 is a detailed block diagram of a space asset tag which is useful for understanding certain aspects of an SVTS.

Referring now to FIG. 5, there is provided a block diagram 500 showing additional detail of SVTS 300 including battery 502, solar cell 504, power supply 505, data store 520 and pressure sensor 518. Also shown in FIG. 5 are additional details of the GLRF transmitter 306.

In the embodiment shown in FIG. 5, the GLRF transmitter 306 is a low rate MFSK transmitter which transmits digital data by using an MFSK waveform comprised of multiple discrete frequency changes of a carrier signal. Accordingly, the GLRF transmitter includes a tone oscillator 510 which is configured for generating M discrete frequencies or tones. For example, if configured for 16-MFSK modulation, then the tone oscillator 510 will be capable of generating 16 different tones, each corresponding to a particular data symbol. The tone to be transmitted for each symbol is specified by the control processor 302 to facilitate communication of tracking data message. Of course other types of low rate MFSK modulation schemes are also possible and are intended to be included within the scope of the disclosed embodiments. Examples include Olivia MFSK (which in a default mode sends one of 32 tones at a time), the THROB family of modulation modes which use a combination of MFSK and amplitude modulation, and JT65 (which uses 65 modulation tones). Embodiments are not limited in this regard and other low rate modulation schemes, whether now known or known in the future, are also possible.

The low power tone output of the tone oscillator 510 is communicated to a modulator 511. A mixer 512 associated with the modulator will modulate the selected tone onto an RF carrier signal provided by a local oscillator 514. The resulting modulated signal is communicated to an RF power amplifier which increases the transmit power to a suitable level. The output from the RF power amplifier is coupled to the antenna 208 so that the signal can be communicated to the ground station 400.

The GLRF transmitter can be configured to transmit the tracking information at any suitable RF frequency. However, in an embodiment disclosed herein the transmit frequency of the GLRF is contained within the Ultra High Frequency (UHF) band so as to minimize antenna size requirements. The selected transmit frequency should be as low as possible within the UHF band to minimize Doppler shift since a lower frequency incurs a lower Doppler frequency shift. The frequency should also be high enough to minimize antenna size. In one embodiment, the transmit frequency can be advantageously selected to be in a 1 MHz slice of RF spectrum between 1214 and 1215 MHz to take advantage of these two competing parameters. However, the embodiments are not limited in this regard and other suitable frequency ranges are of course possible. In some embodiments, the GLRF transmitter is configured to transmit the tracking information in a transmitted signal having a bandwidth not exceeding 500 Hz. Signal bandwidth can be minimized so that it is within this range by maintaining a relatively slow symbol rate and by eliminating (or minimizing) phase discontinuities which occur when switching between different tones.

The data store 520 contains a ground station database 522. The ground station database comprises data which is sufficient to allow the control processor 302 to determine when tracking message data should be transmitted, by comparing such information to its current position. Tracking data messages are advantageously communicated at times when such transmissions are likely to be received by a ground station. A suitable location for such transmission will include locations where there is an unobstructed line of sight path between the GLRF antenna 208 and a ground station antenna to facilitate a communication link 112. In many scenarios, there may be a range of tag positions or locations where these conditions are satisfied. Accordingly, the control unit can optimize a transmit position by selecting a location where (1) the GLRF antenna has an unobstructed line-of-sight path between the space asset tag and the ground station, and (2) a vector distance between the space asset tag and the ground station antenna is minimized. The control processor can then cause the tracking message data to be transmitted during a time corresponding to a minima of such vector distance.

The data contained in the ground station database 522 can comprise latitude and longitude information pertaining to the location of one or more ground stations 400. Alternatively (or in addition thereto), the ground station database can comprise mapping data specifying a range of tag locations in which communications with a particular ground station 400 are possible. Further, the ground station database can comprise mapping data specifying a range of geographic locations in which communication with a particular ground station 400 is optimal (e.g. a vector distance between the space asset tag and ground station is less than some predetermined value). When in orbit, the control processor 302 compares a current location of the space asset tag 200 to information contained in the ground station database 522 to determine when the space asset tag is in a suitable location to begin transmitting tracking message data.

In an embodiment, the SVTS operates in a low power or sleep mode while within the Earth's atmosphere and only begins monitoring its position and transmitting tracking information when the tag departs from the Earth's atmosphere. The pressure sensor 518 is provided in the SVTS 300 to detect when the space asset tag has departed from Earth's atmosphere. When such occurrence has been detected, it serves as an indication that the SVTS should begin actively monitoring its position and transmitting tracking message data. In some embodiments, the control processor can also be completely or partially powered down during such low power mode of operation.

The power supply 505 exclusively provides electrical power to the SVTS and does not receive power from an external device, such as satellite 100. The electrical power provided by power supply 505 can be sourced from a battery 502 which include one or more battery cells. The number and/or energy storage capacity of the battery 502 can be selected in accordance with mission requirements. A first voltage regulator 506 can regulate the output of the battery to ensure a stable output voltage for the SVTS. In some embodiments, the power supply 505 can also derive electric power from a solar cell 504 which is comprised of one or more photovoltaic elements. The output voltage and/or current from the solar cell 504 can be regulated by a second voltage regulator circuit 508. The second voltage regulator circuit can also control a charging voltage that is communicated to the batter 502 for powering the SVTS during times when there is insufficient power being generated by the solar cell 504.

The control processor 302 can be comprised of an electronic circuit such as a processor, a microcontroller, an application specific circuit, a programmable logic device, a digital signal processor, or other circuit programmed to perform the functions described herein. Embodiment control processors can be realized in one device or several interconnected devices. Any kind of control processor or other apparatus adapted for carrying out the methods described herein is suited. Some embodiments may implement functions in two or more specific interconnected hardware modules or devices with related control and data signals communicated between and through the modules, or as portions of an application-specific integrated circuit. Thus, the exemplary system is applicable to software, firmware, and hardware implementations. A typical combination of hardware and software for implementing the control processor can be a microcontroller having a computer program that can control the device such that it carries out the methods described herein.

The data store 520 can comprise a machine readable medium on which is stored one or more sets of instructions 524 (e.g. software) which are used to facilitate one or more of the methodologies and functions described herein. The term "machine-readable medium" shall be understood to include any tangible medium that is capable of storing instructions or data structures which facilitate any one or more of the methodologies of the present disclosure. Exemplary machine-readable media can include magnetic disks, semiconductor memory devices, electrically erasable programmable read-only memory (EEPROM)) and flash memory devices. A tangible medium as described herein is one that is non-transitory insofar as it does not involve a propagating signal.

The described features, advantages and characteristics disclosed herein may be combined in any suitable manner in one or more embodiments. One skilled in the relevant art will recognize, in light of the description herein, that the embodiments can be practiced without one or more of the specific features or advantages of a particular embodiment. In other instances, additional features and advantages may be recognized in certain embodiments that may not be present in all embodiments.

Reference throughout this specification to "one embodiment", "an embodiment", or similar language means that a particular feature, structure, or characteristic described in connection with the indicated embodiment is included in at least one embodiment. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the embodiments have been illustrated and described with respect to one or more implementations, equivalent alterations and modifications will occur to others skilled in the art upon the reading and understanding of this specification and the annexed drawings. Thus, the breadth and scope of the embodiments disclosed herein should not be limited by any of the above described embodiments. Rather, the scope of the invention should be defined in accordance with the following claims and their equivalents.

We claim:

1. A space asset tracking system, comprising:
    a space asset tag including:
        a tag housing; and
        a space vehicle tracking system (SVTS) disposed within the tag housing, the SVTS including:
            a power supply which exclusively provides electrical power to the SVTS;
            a position sensing receiver system (PSRS) configured to detect a position of the SVTS based on PSRS radio signals which are received respectively from a plurality of earth orbiting satellites;
            a processing circuit which receives from the PSRS position information specifying at least the position; and
            a ground link radio frequency (GLRF) transmitter under the control of the processing circuit;
    wherein the processing circuit autonomously (1) uses the PSRS position information to determine a transmission location at which the SVTS is to be when transmitting tracking information to a given station, and (2) causes transmission of the tracking information from the GLRF transmitter when the SVTS is at the transmission location.

2. The space asset tracking system according to claim 1, wherein the processing circuit is configured to cause the tracking information to be transmitted exclusively during periods when a direct radio frequency communication link is possible with one or more designated ground stations.

3. The space asset tracking system according to claim 1, wherein the space asset tag is exclusive of a GLRF receiver for receiving radio signals from a ground station, and the processing circuit is configured to autonomously cause the tracking information to be transmitted exclusive of control signals external of the space asset tag.

4. The space asset tracking system according to claim 1, wherein the SVTS further comprises at least one data storage device in which a ground station database is stored, the ground station database containing map information to facilitate a determination of when the space asset tag is located to transmit the tracking information to one or more of the ground stations.

5. The space asset tracking system according to claim 4, wherein the processing circuit is configured to compare the position information obtained from the PSRS to the information contained in the ground station database.

6. The space asset tracking system according to claim 1, wherein the GLRF transmitter is configured to transmit the tracking information at a specified frequency contained within the Ultra High Frequency (UHF) band.

7. The space asset tracking system according to claim 6, wherein the GLRF transmitter has an output of between 20 mW and 100 mW.

8. The space asset tracking system according to claim 6, wherein the GLRF transmitter is configured to transmit the tracking information in a transmitted signal having a bandwidth not exceeding 500 Hz.

9. The space asset tracking system according to claim 1, wherein the PSRS is configured to derive the position using signals associated with at least one satellite-based navigation system selected from the group consisting of a Global Positioning System (GPS), a Global Navigation Satellite System (GLONASS), a Galileo Global Navigation Satellite System (GNSS), a BeiDou Navigation Satellite System, a GPS Aided GEO Augmented Navigation (GAGAN) system, and an Indian Regional Navigation Satellite System (IRNSS).

10. The space asset tracking system according to claim 1, further comprising at least one PSRS antenna system integrated in or on the tag housing and operatively coupled to the PSRS to facilitate receiving the PSRS radio signals.

11. The space asset tracking system according to claim 1, further comprising at least one GLRF antenna system integrated in or on the tag housing and operatively coupled to the GLRF transmitter to facilitate transmitting the tracking information to the one or more designated ground stations.

12. The space asset tracking system according to claim 11, wherein the GLRF antenna system comprises an omnidirectional antenna for transmitting the tracking information to the one or more designated ground stations.

13. The space asset tracking system according to claim 1, wherein the power supply is comprised of at least one of a battery and a photovoltaic cell.

14. The space asset tracking system according to claim 1, wherein the SVTS further comprises at least one sensing element which detects when the space asset tag is in a space environment.

15. The space asset tracking system according to claim 1, further comprising at least one ground station located on the surface of the earth and configured for receiving the tracking information transmitted by the GLRF transmitter, the ground station including at least one processing circuit configured to automatically remove a Doppler shift in a received signal from the space asset tag.

16. A space asset tracking system, comprising:
    a space asset tag including
        a tag housing;
        a space vehicle tracking system (SVTS) disposed within the tag housing;
        the SVTS including
            a power supply which exclusively provides electrical power to the SVTS;
            a position sensing receiver system (PSRS) configured to detect a position of the SVTS based on PSRS radio signals which are received respectively from a plurality of earth orbiting satellites;
            a processing circuit which receives from the PSRS position information specifying at least the position;
            a ground link radio frequency (GLRF) transmitter under the control of the processing circuit;
            at least one data storage device in which a ground station database is stored containing information concerning locations of ground stations;
        at least one PSRS antenna system integrated in or on the tag housing and operatively coupled to the PSRS to facilitate receiving the PSRS radio signals;
        at least one GLRF antenna system integrated in or on the tag housing and operatively coupled to the GLRF transmitter;

wherein the processing circuit autonomously (1) uses the PSRS position information to determine a transmission location at which the SVTS is to be when transmitting tracking information to a given station, and (2) causes transmission of the tracking information from the GLRF transmitter when the SVTS is at the transmission location.

17. The space asset tracking system according to claim 16, wherein the GLRF transmitter is configured to transmit the tracking information at a specified frequency contained within the Ultra High Frequency (UHF) band.

18. The space asset tracking system according to claim 16, wherein the GLRF transmitter has an output of between 20 mW and 100 mW.

19. The space asset tracking system according to claim 16, wherein the GLRF transmitter is configured to transmit the tracking information in a transmitted signal having a bandwidth not exceeding 500 Hz.

20. The space asset tracking system according to claim 16, wherein the GLRF antenna system comprises an omnidirectional antenna for transmitting the tracking information to the one or more designated ground stations.

21. The space asset tracking system according to claim 16, wherein the SVTS further comprises at least one sensing element which detects when the space asset tag is outside of the earth's atmosphere, and the processing circuit is responsive to the at least one sensing element to control selected operations of the SVTS.

22. The space asset tracking system according to claim 16, further comprising at least one ground station located on the surface of the earth and configured for receiving the tracking information transmitted by the GLRF transmitter, the ground station including at least one processing circuit configured to automatically remove a Doppler shift in a received signal from the space asset tag.

* * * * *